United States Patent
Buchon et al.

(10) Patent No.: US 9,387,631 B2
(45) Date of Patent: Jul. 12, 2016

(54) METHOD OF MANUFACTURING AN OPHTHALMIC LENS FOR PROVIDING AN OPTICAL DISPLAY

(75) Inventors: Cedric Buchon, Charenton-le-Pont (FR); Gerard Gelly, Charenton-le-Pont (FR); Chefik Habassi, Charenton-le-Pont (FR); Gerard Martin, Charenton-le-Pont (FR); Vincent Roptin, Charenton-le-Pont (FR); Antoine Videmann, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 670 days.

(21) Appl. No.: 13/700,771

(22) PCT Filed: Jun. 14, 2011

(86) PCT No.: PCT/EP2011/059787
§ 371 (c)(1),
(2), (4) Date: Nov. 29, 2012

(87) PCT Pub. No.: WO2012/004089
PCT Pub. Date: Jan. 12, 2012

(65) Prior Publication Data
US 2013/0069260 A1     Mar. 21, 2013

(30) Foreign Application Priority Data
Jul. 5, 2010   (EP) .................................. 10305730

(51) Int. Cl.
*B29C 70/68*   (2006.01)
*B29D 11/00*   (2006.01)

(52) U.S. Cl.
CPC .......... *B29C 70/68* (2013.01); *B29D 11/00663* (2013.01)

(58) Field of Classification Search
CPC .. B29C 70/68; B29C 39/10; B29D 11/00413; B29D 11/0048; B29D 11/0049; B29D 11/005; B29D 11/00528; B29D 11/00009; B29D 11/00663; B29D 11/00
USPC .............................................. 264/2.7, 1.9, 1.7
See application file for complete search history.

(56) References Cited

U.S. PATENT DOCUMENTS

| | | | |
|---|---|---|---|
| 4,795,667 A | 1/1989 | Armstrong | |
| 5,069,852 A | 12/1991 | Leone et al. | |
| 5,170,192 A * | 12/1992 | Pettigrew et al. | 351/159.41 |
| 2001/0033401 A1 | 10/2001 | Kasai et al. | |
| 2004/0131849 A1 * | 7/2004 | Wires | 428/375 |
| 2007/0229756 A1 | 10/2007 | Mandler et al. | |
| 2008/0273246 A1 | 11/2008 | Moliton et al. | |

OTHER PUBLICATIONS

International Search Report dated Nov. 25, 2010.

* cited by examiner

*Primary Examiner* — Yogendra Gupta
*Assistant Examiner* — Ninh Le
(74) *Attorney, Agent, or Firm* — Sofer & Haroun, LLP

(57) ABSTRACT

A method for manufacturing an ophthalmic lens includes molding the lens (1) between a first mold portion (6A) and a second mold portion (6B) with the first entry surface (4A) formed by making in the lens a molded cavity by means of a stud (6C) secured to the second mold portion (6B), and that the light guide (4) is temporarily secured to the stud (6C) prior to molding. The second entry surface (4B) is formed by making in the lens a molded cavity by means of a mold insert (7) temporarily secured to the light guide (4) prior to molding, the first mold portion (6A) being placed above said insert (7).

5 Claims, 3 Drawing Sheets

PRIOR ART

METHOD OF MANUFACTURING AN OPHTHALMIC LENS FOR PROVIDING AN OPTICAL DISPLAY

RELATED APPLICATIONS

This application is a National Phase Application of PCT/FR2011/059787, filed on Jun. 14, 2011, which in turn claims the benefit of priority from European Patent Application No. 10 305 730.3 filed on Jul. 5, 2010, the entirety of which are incorporated herein by reference.

BACKGROUND

1. Field of the Invention

The present invention relates to a method of manufacturing an ophthalmic lens for making an optical display by means of an optical imager designed to allow information of the image or multimedia type to be viewed. The term "lens" is used herein to designate an optical system suitable in particular for being positioned in a frame for spectacles or eyeglasses.

This term "lens" is used to mean a finished lens ready for placing on a spectacles frame, or an unfinished lens or lens blank, i.e. that still needs to be subjected to at least one treatment, e.g. surfacing, in order to be usable.

2. Description of Related Art

The document WO 2006/016086 discloses a method of manufacturing a vision-correction lens 1 as represented in FIG. 1, that has a front face 1A and a rear face 1B, and into which light beams coming from a micro display 5 and emitted by an optical element of a light beam generator system 2 are introduced via an entry surface 3 and directed towards the eye of the wearer to enable information content to be viewed. The light beams are reflected a plurality of times between two reflection faces, between being introduced into the lens and exiting therefrom, these two reflection faces being faces of a transparent optical insert constituted by a light guide 4. According to this known method, the insert 4 is completely contained within the lens 1.

With this method of manufacturing an ophthalmic display, the vision of a user can be corrected, while being mass-produced in reliable manner, with this being achieved by decoupling the display and the vision-correction functions.

The entry surface 3 is formed by making a molded cavity in the lens, and it constitutes the bottom of the cavity. The cavity is molded by means of a stud secured to a mold portion, and the insert 4 is temporarily secured to this stud prior to molding. Once the lens is manufactured, the light beam generator system 2 is then placed on this entry surface 3.

Other solutions propose such lens for making an optical display with complex light beam generator system formed by two optical pieces as represented in FIG. 2.

The first beam generator piece 2A is placed and stuck on the rear face of the light guide 4 and the second optical piece 2B is placed and stuck on the front face of the light guide 4. Such arrangement results in a beam generator system having a smaller volume and a repartition around the lens.

OBJECTS AND SUMMARY

The object of the invention is to propose a method of manufacturing an ophthalmic lens relating to this arrangement with two beam generator pieces.

The invention proposes a method of manufacturing an ophthalmic lens, that has a front face and a rear face, and into which light beams emitted by an optical element of a light beam generator system are introduced and directed towards the eye of the wearer to enable information content to be viewed by means of a transparent light guide, said light beam generator system being constituted by two beam generator pieces, a first beam generator piece placed on a first entry surface of the rear face of the lens and a second beam generator piece placed on a second entry surface of the front face of the lens, method consisting in molding the lens between a first mold portion and a second mold portion and characterized in that the first entry surface is formed by making in the lens a molded cavity by means of a stud secured to the second mold portion, and that the light guide is temporarily secured to said stud prior to molding;

the second entry surface is formed by making in the lens a molded cavity by means of a mold insert temporarily secured to said light guide prior to molding, said first mold portion being placed above said insert.

BRIEF DESCRIPTION OF THE DRAWINGS

The invention is described below in greater detail with the help of figures that show merely a preferred embodiment of the invention.

DETAILED DESCRIPTION

Figure 1:
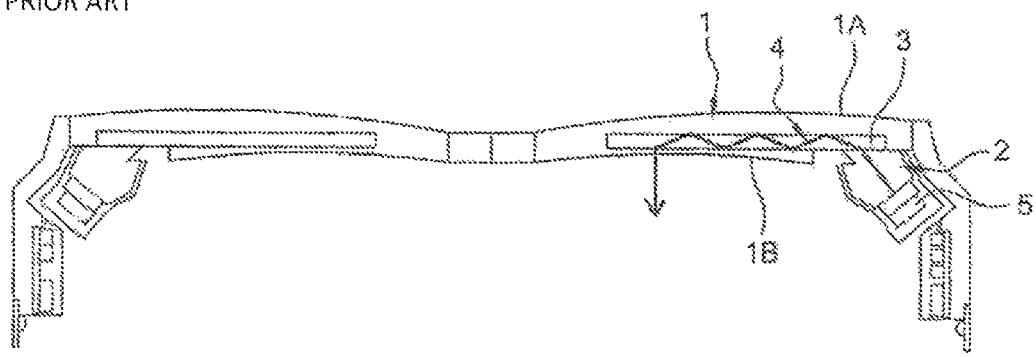
FIG. 1 is a section view of a display including a lens, according to first prior art.
Figure 2:
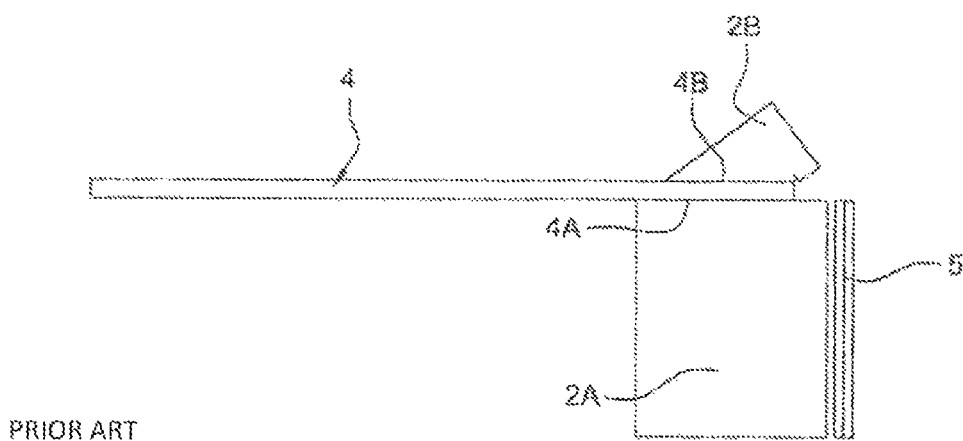
FIG. 2 is a section view of a display including a lens, according to second prior art.
Figure 3A:
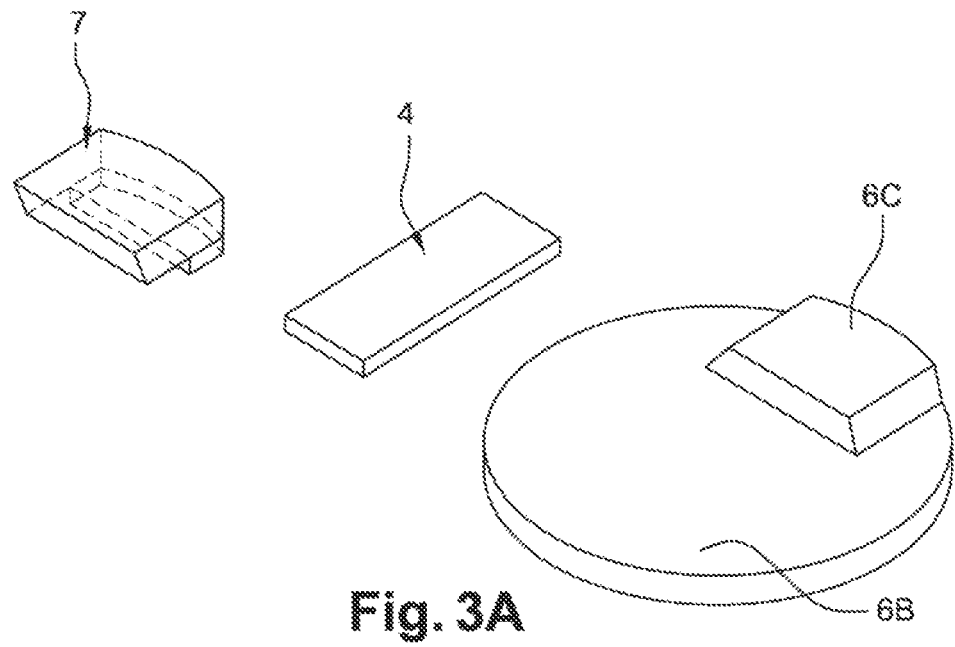
FIGS. 3A and 3B are perspective views showing the method in accordance with the invention for manufacturing the lens according to second prior art.
Figure 3B:
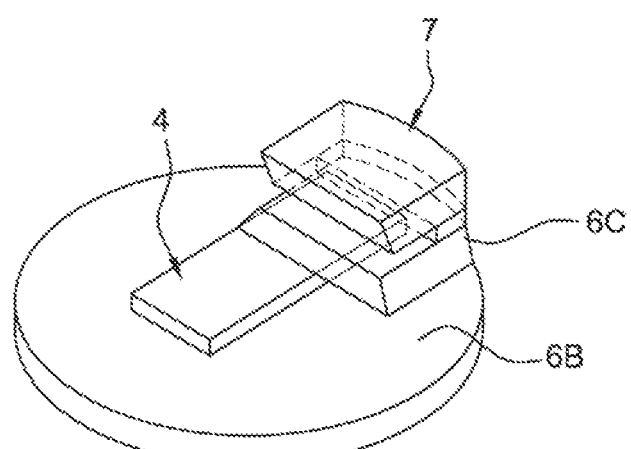

As represented in FIGS. 1 and 2, the invention concerns a method of manufacturing a vision-correction lens 1, that has a front face 1A and a rear face 1B, and into which light beams emitted by an optical element of a light beam generator system 2A, 2B are introduced and directed towards the eye of the wearer to enable information content to be viewed by means of a transparent light guide 4. The light beam generator system is constituted by two optical pieces, a first beam generator piece 2A placed on a first entry surface 4A of the rear face of the lens and a second optical piece 2B placed on a second entry surface 4B of the front face of the lens.

The mold for manufacturing the lens essentially comprises two mold portions, a first mold optical 6A for molding the front face of the blank lens, and a second mold portion 6B for molding the rear face of the blank lens.

The method consists in molding the lens 1 between a first mold portion 6A and a second mold portion 6B and the first entry surface 4A is formed by making in the lens a molded cavity by means of a stud 6C secured to the second mold portion 6B, and the light guide 4 is temporarily secured to the stud 6C prior to molding;

the second entry surface 4B is formed by making in the lens a molded cavity by means of a mold insert 7 temporarily secured to the stud 6C and to the light guide 4 prior to molding, the first mold portion 6A being placed above the insert 7.

The first entry surface 4A through which the light beams emitted by the optical element of the first light beam generation piece 2A are introduced is formed by making a molded cavity in the lens, with the surface constituting the bottom of the cavity.

This cavity is molded by means of the stud 6C secured to the second mold portion 6B, and preferably integral therewith, and the light guide 4 is secured temporarily on the stud by adhesive prior to molding. The stud 6C is placed on a side edge of the second portion 6B.

The surface of the stud 6C that is to receive the light guide 4 is coated with adhesive, preferably a organic resin cured by UV and called "Mitsui Resin 8UV", and the light guide is positioned on the stud 6C by an appropriate tool as a function of a marking provided on the mold. The light guide is pressed against the stud and held until the adhesive has polymerized. When using MR8 ("Mitsui Resin 8"), it is initiated with a particular photoinitiator that enables polymerization to take place quickly under UV radiation.

Most advantageously, the light guide 4 is secured temporarily to the stud 6C prior to molding by means of a layer of the monomer constituting the lens 1. As a result, the thin layer of monomer serving to bond the light guide then acts after unmolding as a thin layer covering the light guide at the entry surface 4A and presenting the same refractive index as the remainder of the lens 4.

Above this arrangement, according to the invention, the mold insert 7 is temporarily secured to the stud 6C and to the light guide 4 prior to molding. This mold insert 7 has a section in form of L, a branch of the L being placed on the stud 6C and other branch of the L being place on the light guide 4.

The means for temporarily securing the mold insert 7 to the stud 6C and the light guide 4 are preferably the means used for temporarily securing the light guide 4 with the stud 6C and detailed here above.

Figure 4A:
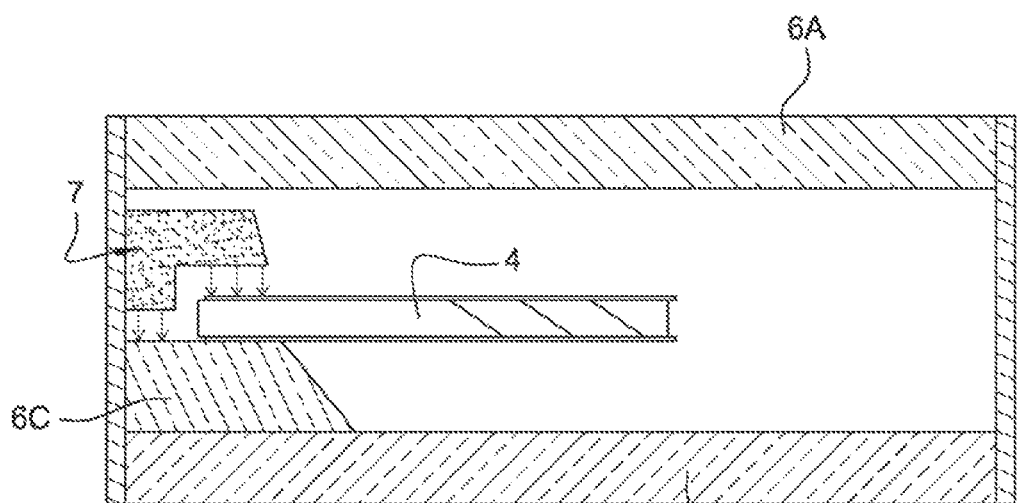
FIGS. 4A to 4D are vertical section views showing the method in accordance with the invention for manufacturing the lens according to second prior art.
Figure 4B:
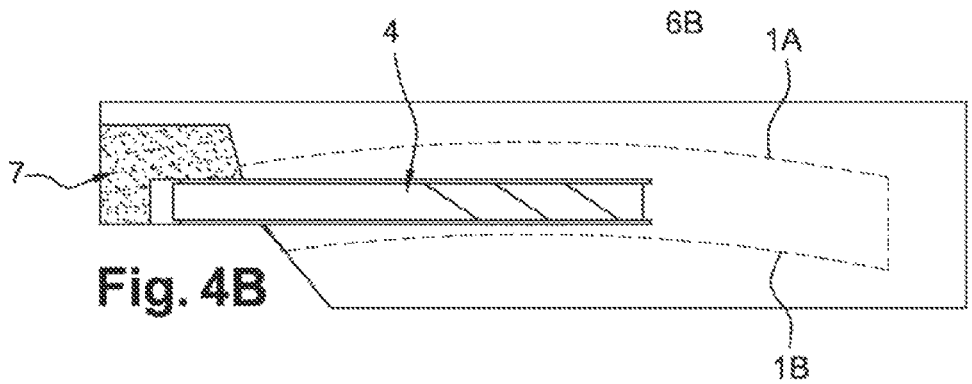

Once the light guide has been secured to the stud and the mold insert 7 has been secured to the stud and to the light guide, the stud and the mold insert being symmetric relating to a transverse plane and superposed together with a common plane of symmetry, the mold arrangement is covered by the first mold portion 6A, the space between the first mold portion 6A and the second mold portion 6B being closed by a cylindrical element, a monomer is cast and polymerized by heating the mold and a blank lens as shown in FIG. 4B is obtained.

Figure 4C:
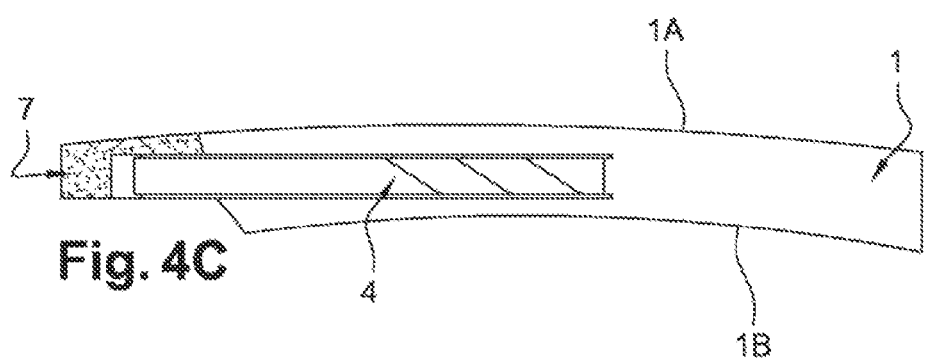

The front face 1A of the lens 1 and the rear face 1B of the lens are then surfaced, the front face 1A being surfaced before removing the mold insert 7 from the lens, as represented in FIGS. 4B and 4C.

Figure 4D:
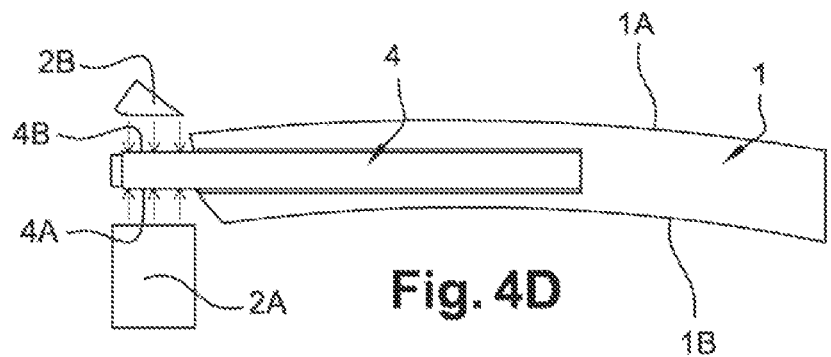

Once the mold insert 7 has been removed from the light guide, as represented in FIG. 4D, this manufactured lens 1 can then be equipped with the first and second beam generator pieces 2A, 2B.

The mold portions 6A, 6B and the mold insert 7 may be made of metal, e.g. of X15 steel coated with a TiCN treatment to allow disassembly.

They may be of thermoplastic organic material, preferably of a material that does not adhere to the monomer resin used, e.g. polypropylene or TPX.

They may be of inorganic material with a coating constituted for example by a top coat or by an unmolding agent that can be added to the polymerizabie resin constituting the lens 1.

By way of example, the used monomer for molding the lens 1 may be MR6.

The two mold portions 6A or 6B may be plane or curved depending on whether it is desired to manufacture a finished lens ready for positioning in a frame, or a lens blank as here described, i.e. that needs to be subjected to at least one further treatment, e.g. surfacing, in order to be usable.

The invention claimed is:

1. A method of manufacturing an ophthalmic lens, said lens having a front face and a rear face, and into which light beams emitted by an optical element of a light beam generator system are introduced and directed towards an eye of a wearer to enable information content to be viewed by a transparent light guide, said light beam generator system being constituted by optical pieces, a first optical piece placed on a first entry surface of the rear face of the lens and a second optical piece placed on a second entry surface of the front face of the lens,
   said method comprising the step of
   molding the lens between a first mold portion and a second mold portion and wherein
   the first entry surface is formed by making in the lens a molded cavity using a stud secured to the second mold portion, and that the light guide is temporarily secured to said stud prior to molding;
   the second entry surface is formed by making in the lens second a molded cavity using a mold insert temporarily secured to said light guide prior to molding, said first mold portion being placed above said mold insert, said mold insert has a section in a form of an L-shape, a branch of the L-shape being placed on and directly contacting a top surface of said stud and the other branch of the L-shape being placed on the light guide; and wherein said light guide directly contact said top surface of said stud.

2. A method according to claim 1, wherein said mold insert and the light guide are temporarily secured using an organic resin adhesive cured by UV.

3. A method according to claim 1, wherein said mold insert is temporarily secured to said stud.

4. A method according to claim 3, wherein said mold insert and said stud are temporarily secured using an organic resin adhesive cured by UV.

5. A method according to claim 1, wherein the front face of said lens is surfaced before removing said mold insert from the lens.

\* \* \* \* \*